(12) United States Patent
Jeong et al.

(10) Patent No.: US 10,430,141 B2
(45) Date of Patent: Oct. 1, 2019

(54) DISPLAY METHOD AND APPARATUS IN PORTABLE TERMINAL

(75) Inventors: Yong-Soo Jeong, Gyeonggi-do (KR); Jin Park, Gyeonggi-do (KR); Min-Ji Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 190 days.

(21) Appl. No.: 13/592,944

(22) Filed: Aug. 23, 2012

(65) Prior Publication Data

US 2013/0050230 A1    Feb. 28, 2013

(30) Foreign Application Priority Data

Aug. 23, 2011  (KR) ........................ 10-2011-0083983

(51) Int. Cl.
| | | |
|---|---|---|
| *G06T 1/00* | (2006.01) | |
| *G06F 3/14* | (2006.01) | |
| *G09G 5/14* | (2006.01) | |
| *G06F 3/147* | (2006.01) | |

(52) U.S. Cl.
CPC ............ *G06F 3/1438* (2013.01); *G06F 3/147* (2013.01); *G06F 3/1423* (2013.01); *G06F 3/1454* (2013.01); *G09G 5/14* (2013.01); *G09G 2340/12* (2013.01); *G09G 2340/14* (2013.01); *G09G 2370/04* (2013.01); *G09G 2370/06* (2013.01); *G09G 2370/10* (2013.01); *G09G 2370/16* (2013.01)

(58) Field of Classification Search
CPC ......... G06T 15/005; G06T 1/20; G06T 15/04; G09G 5/363; G06F 3/14
USPC ................... 345/2.2, 520, 522; 715/804, 805
See application file for complete search history.

(56) References Cited

U.S. PATENT DOCUMENTS

| | | | |
|---|---|---|---|
| 6,781,635 B1 | 8/2004 | Takeda | |
| 6,816,129 B1* | 11/2004 | Zimmerman | .................. 345/1.1 |
| 8,836,718 B2* | 9/2014 | Choi | ..................... G06F 1/1694 |
| | | | 345/173 |
| 2001/0027561 A1* | 10/2001 | White | ................ H04N 7/17318 |
| | | | 725/1 |
| 2002/0171624 A1* | 11/2002 | Stecyk | ............... H04L 12/2805 |
| | | | 345/156 |
| 2004/0153274 A1* | 8/2004 | Fukuda | ......................... 702/117 |
| 2004/0162022 A1* | 8/2004 | Lahetkangas et al. ...... 455/41.1 |

(Continued)

FOREIGN PATENT DOCUMENTS

| | | |
|---|---|---|
| CN | 1595875 | 3/2005 |
| CN | 1922652 | 2/2007 |

(Continued)

OTHER PUBLICATIONS

Apple Inc.; 2007, YouTube, Steve Jobs iPhone 2007 Presentation; Minutes 20-22 (https://www.youtube.com/watch?v=vN4U5FqrOdQ).*

(Continued)

*Primary Examiner* — Todd Buttram
(74) *Attorney, Agent, or Firm* — The Farrell Law Firm, P.C.

(57) ABSTRACT

A display method and apparatus of a portable terminal are provided. A given application is executed on the portable terminal and the executed application is entered into a division mode. At least one device other than the portable terminal is set to output at least one of a plurality of layers of the executed application. The at least one layer is transmitted to the at least one device.

18 Claims, 7 Drawing Sheets

(56) References Cited

U.S. PATENT DOCUMENTS

| | | | |
|---|---|---|---|
| 2005/0053017 A1* | 3/2005 | Komiya et al. | 370/255 |
| 2006/0052998 A1* | 3/2006 | Michelman | 703/22 |
| 2007/0121012 A1* | 5/2007 | Hida et al. | 348/589 |
| 2008/0106645 A1* | 5/2008 | Lee | H04N 5/44504 348/565 |
| 2009/0249359 A1 | 10/2009 | Caunter et al. | |
| 2010/0138780 A1* | 6/2010 | Marano et al. | 715/804 |
| 2010/0188088 A1* | 7/2010 | Nielsen et al. | 324/329 |
| 2010/0226526 A1* | 9/2010 | Modro | G06K 9/00577 382/100 |
| 2010/0271288 A1* | 10/2010 | Srinivasan et al. | 345/2.2 |
| 2011/0246904 A1 | 10/2011 | Pinto et al. | |
| 2012/0026189 A1* | 2/2012 | Yokoyama et al. | 345/619 |
| 2012/0050183 A1* | 3/2012 | Lee | 345/173 |
| 2012/0076197 A1* | 3/2012 | Byford | H04N 19/00 375/240.01 |
| 2012/0147268 A1* | 6/2012 | Hassan | H04B 1/69 348/552 |

FOREIGN PATENT DOCUMENTS

| | | |
|---|---|---|
| CN | 201467232 | 5/2010 |
| CN | 101795393 | 8/2010 |
| CN | 101931816 | 12/2010 |
| CN | 201742463 | 2/2011 |
| CN | 102016796 | 4/2011 |
| CN | 102027450 | 4/2011 |
| CN | 102110357 | 6/2011 |
| CN | 102918490 | 2/2013 |
| KR | 1020090078168 | 7/2009 |
| KR | 1020110032324 | 3/2011 |
| WO | WO 2009/143294 | 11/2009 |
| WO | WO 2011/090951 | 7/2011 |

OTHER PUBLICATIONS

Chinese Office Action dated Aug. 17, 2015 issued in counterpart application No. 201210303677.3, 19 pages.
Korean Office Action dated Sep. 19, 2017 issued in counterpart application No. 10-2011-0083983, 7 pages.
"How to Set Up Apple AirPlay", What Hi-Fi?, YouTube, https://www.youtube.com/watch?v=4m4xrqLZDdc, Aug. 4, 2011, 3 pages.
"Samsung Galaxy S2 DLNA Demo", Hemorrdroidsnet, YouTube, https://www.youtube.com/watch?v=xEFdjqmgngA, Apr. 30, 2011, 1 page.
Chinese Office Action dated Dec. 3, 2018 issued in counterpart application No. 201610987198.6, 16 pages.
European Search Report dated Aug. 13, 2019 issued in counterpart application No. 18178880.3-1210, 9 pages.

* cited by examiner

DISPLAY METHOD AND APPARATUS IN PORTABLE TERMINAL

PRIORITY

This application claims priority under 35 U.S.C. § 119(a) to a Korean Patent Application filed in the Korean Intellectual Property Office on Aug. 23, 2011 and assigned Serial No. 10-2011-0083983, the contents of which are incorporated herein by reference.

BACKGROUND OF THE INVENTION

1. Field of the Invention

The present invention relates generally to a portable terminal, and more particularly, to a method and apparatus for displaying an application that is driven through a plurality of On Screen Display (OSD) layers.

2. Description of the Related Art

Portable terminals have evolved into smart phones that provide users with various useful services through applications that provide a variety of functions. Accordingly, portable terminal use has increased.

Users have accessed multimedia contents through other devices, such as a tablet and a notebook, which may be carried along with a portable terminal (e.g., smart phone). Users have also accessed multimedia through a television (TV) at home.

Since users are able to access multimedia contents through various electronic devices, services capable of utilizing the various electronic devices have also been proposed. One example of such a service is the N-screen service.

The N-screen service is a multi-device service that allows a user to use content without disconnection from a TV, a desktop PC, and a portable terminal. Accordingly, content that was previously able to be used in only one device can now be used through interactions between screens of multiples devices.

This N-screen service is advantageous in that a user can use/access multimedia contents anytime and any place regardless of the device used. However, the N-screen service lacks a function that enables more user-friendly use of multimedia contents through various electronic devices.

SUMMARY OF THE INVENTION

The present invention has been made to address at least the above problems and/or disadvantages and to provide at least the advantages described below. Accordingly, an aspect of the present invention provides a method and apparatus that can increase convenience of use of a portable terminal by taking advantage of devices around the portable terminal when a user uses the portable terminal.

In accordance with an aspect of the present invention, a display method in a portable terminal is provided. A given application is executed on the portable terminal and the executed application is entered into a division mode. At least one device other than the portable terminal is set to output at least one of a plurality of layers of the executed application. The at least one layer is transmitted to the at least one device. In accordance with another aspect of the present invention, a display apparatus is provided in a portable terminal. The display apparatus includes a controller for controlling the portable terminal such that when a given application is executed on the portable terminal and enters a division mode, at least one device other than the portable terminal is set to output at least one of a plurality of layers of the executed application, and the at least one layer is transmitted to the at least one device.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Detailed descriptions of constructions or processes known in the art may be omitted to avoid obscuring the subject matter of the present invention.

Figure 1:
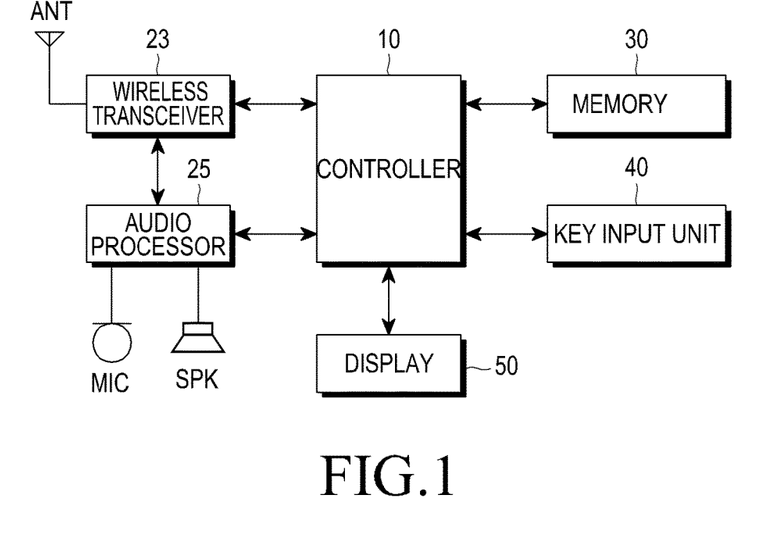
FIG. 1 is a block diagram illustrating a portable terminal, according to an embodiment of the present invention.

FIG. 1 is a diagram illustrating a portable terminal, according to an embodiment of the present invention.

A wireless transceiver 23 includes a radio frequency (RF) unit and a modem. The RF unit includes an RF transmitter for up-converting and amplifying the frequency of a transmitted signal. The RF unit also includes an RF receiver for low noise-amplifying a received signal and down-converting the frequency of the received signal. The modem includes a transmitter for encoding and modulating a signal to be transmitted. The modem also includes a receiver for demodulating and decoding a signal received by the RF unit.

An audio processor 25 may configure a codec, which includes a data codec and an audio codec. The data codec processes packet data, and the audio codec processes an audio signal, such as, a voice or multimedia file. The audio processor 25 converts a digital audio signal received by the modem into an analog audio signal through the audio codec, and plays back the converted analog audio signal. The audio processor 25 also converts an analog audio signal generated by a microphone into a digital audio signal through the audio codec, and transmits the converted digital audio signal to the modem. The codec may be separately provided or incorporated in a controller 10.

A key input unit 40 may include keys required to input numeral and character information, function keys for setting various functions, a touchpad, or the like. When a display 50 is implemented as a touch screen-type display, such as a capacitive touch screen or a resistive touch screen, the key input unit 40 may include only a minimum number of predetermined keys, and the display 50 may partially substitute for the key input function of the key input unit 40.

A memory 30 may include a program memory and a data memory. A program for controlling the general operation of the portable terminal is stored in the program memory. The memory may further include an external memory, such as a Compact Flash (CF) card, a Secure Digital (SD) card, a micro-SD card, a mini-SD card, an eXtreme Digital (xD) card, or a memory stick. Also, the memory 30 may include a disk, such as a Hard Disk Drive (HDD) or a Solid State Disk (SDD).

The display may be formed by a Liquid Crystal Display (LCD) or an Organic Light Emitting Diode (OLED), such as a Passive Matrix OLED (PMOLED) or an Active Matrix (AMOLED), and outputs various display information generated in the portable terminal. The display 50 may include a capacitive or resistive touch screen and may operate as an input unit for controlling the portable terminal, together with the key input unit 40.

The controller 10 controls the overall operation of the portable terminal, according to an embodiment of the present invention, and may switch and control operations of the portable terminal according to user inputs received through the key input unit 40 or the display 50. According to an embodiment of the present invention, when a given application is executed and enters a division mode, at least one different device is set by the controller 10 to output respective OSD layers of the executed application. The respective OSD layers set for the at least one different device are transmitted to the respective different devices corresponding thereto according to the setting result. The OSD layer set for the portable terminal (first device 210) to which the controller 10 belongs is displayed through the display 50. This operation of the controller 10 is described in greater detail below.

Additional devices that may be included in the portable terminal include, for example, a Bluetooth module, a camera module, a Wi-Fi module, an acceleration sensor, a proximity sensor, a geomagnetic sensor, and a Digital Media Broadcasting (DMB) receiver.

For example, dynamic forces applied to the portable terminal and dynamic motions of the portable terminal may be measured using an acceleration sensor and a gyroscope, separately or in combination. The dynamic forces include, for example accelerations, vibrations and impacts. A request for entering a division mode, according to an embodiment of the present invention, may be made through the measured forces and motions. Further, in a division mode, according to an embodiment of the present invention, OSD layers of an executed application may be transmitted to devices around a user's portable terminal through a short-range communication module, such as, for example, a Bluetooth module, a Near Field Communication (NFC) module, or a Wi-Fi module.

Figure 2:
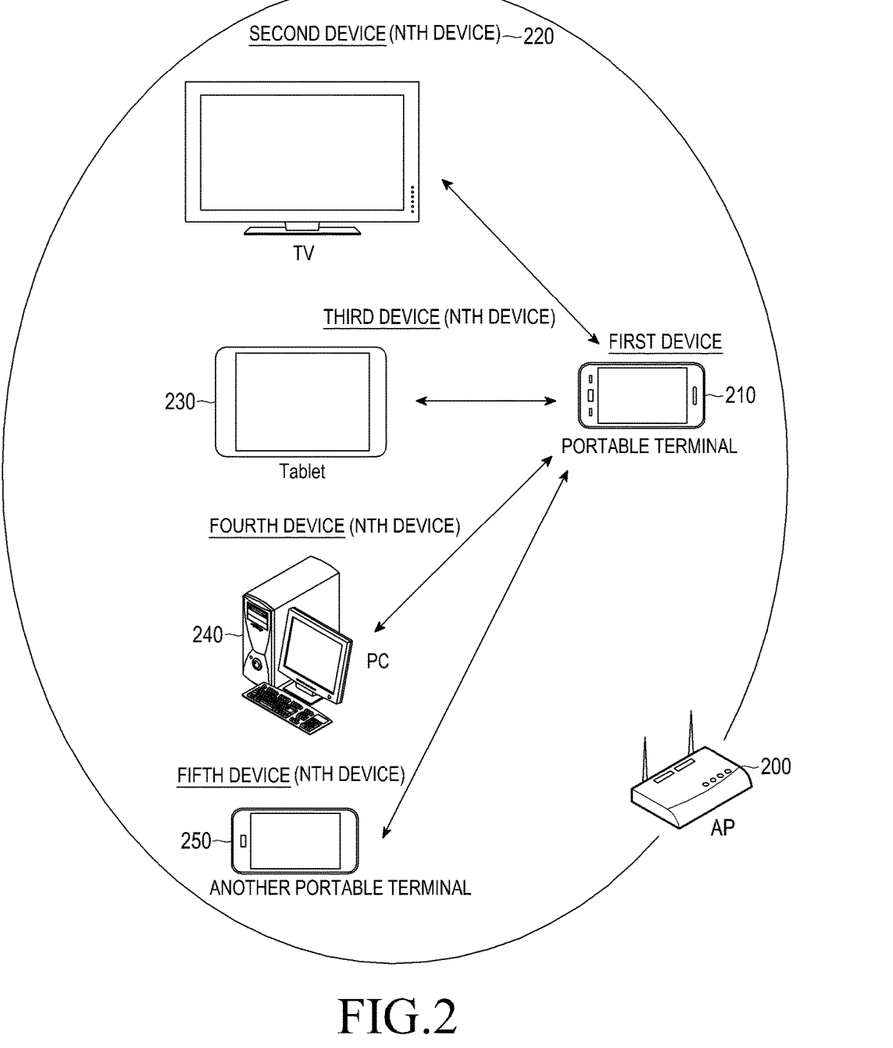
FIG. 2 is a diagram illustrating devices to which a portable terminal can transmit OSD layers, according to an embodiment of the present invention.

FIG. 2 is a diagram illustrating devices to which a portable terminal may transmit OSD layers, according to an embodiment of the present invention.

The portable terminal, according to an embodiment of the present invention, is a mobile electronic device that is easy to carry, and may be embodied as, for example, a video phone, a cellular phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, or the like. The display of this portable terminal, according to an embodiment of the present invention, shows a tendency toward an increasingly larger size, but it typically has a size between 3.5 inches and 4.5 inches.

Referring now to FIG. 2, the multiple electronic devices to which a first device 210 (i.e., the portable terminal) may transmit OSD layers of an application executed in a division mode, are referred to as Nth devices. Since the Nth devices around the portable terminal may include various kinds of devices, they are not limited to the devices shown in FIG. 2. FIG. 2 only illustrates representative devices, each of which has a larger display screen than that of the portable terminal. The Nth devices shown in FIG. 2 include a TV as a second device 220, a tablet as a third device 230, a desktop Personal Computer (PC) as a fourth device 240, and another portable device as a fifth device 250. The portable terminal may form a network with and transmit/receive data to/from the second to fifth devices 220-250 through an Access Point (AP) 200, as shown in FIG. 2. The AP 200 may be included in at least one of the first to fifth devices 210-250, which can be understood as the first to fifth devices 210-250 supporting the AP function.

The TV as the second device 220 has a display screen that is significantly larger than that of the portable terminal. Accordingly, the TV as the second device 220 has a great advantage over the portable terminal, according to an embodiment of the present invention, when playing back a multimedia file, such as a movie.

The tablet as the third device 230 is a device that is rapidly replacing the notebook market. Since the tablet also has a display screen that is larger than that of the portable terminal, it has advantage over the portable terminal when using multimedia files.

Like the TV as the second device 220, the desktop PC as the fourth device 240 includes a monitor that has a larger display screen than that of the portable terminal. Accordingly, since the desktop PC as the fourth device 240 can also display more information or larger-sized information as compared to the portable terminal, it has an advantage over the portable terminal when using multimedia files.

The other portable terminal as the fifth device 250 is a portable terminal similar to the portable terminal as the first device 210, and may be an extra portable terminal possessed by the user or may be a friend's portable terminal. Since portable terminals have various sizes of display screens (i.e., display sizes), the other portable terminal as the fifth device 250 may have a display screen that is smaller than, the same size as, or larger than that of the display screen of the portable terminal as the first device 210.

Figure 3:
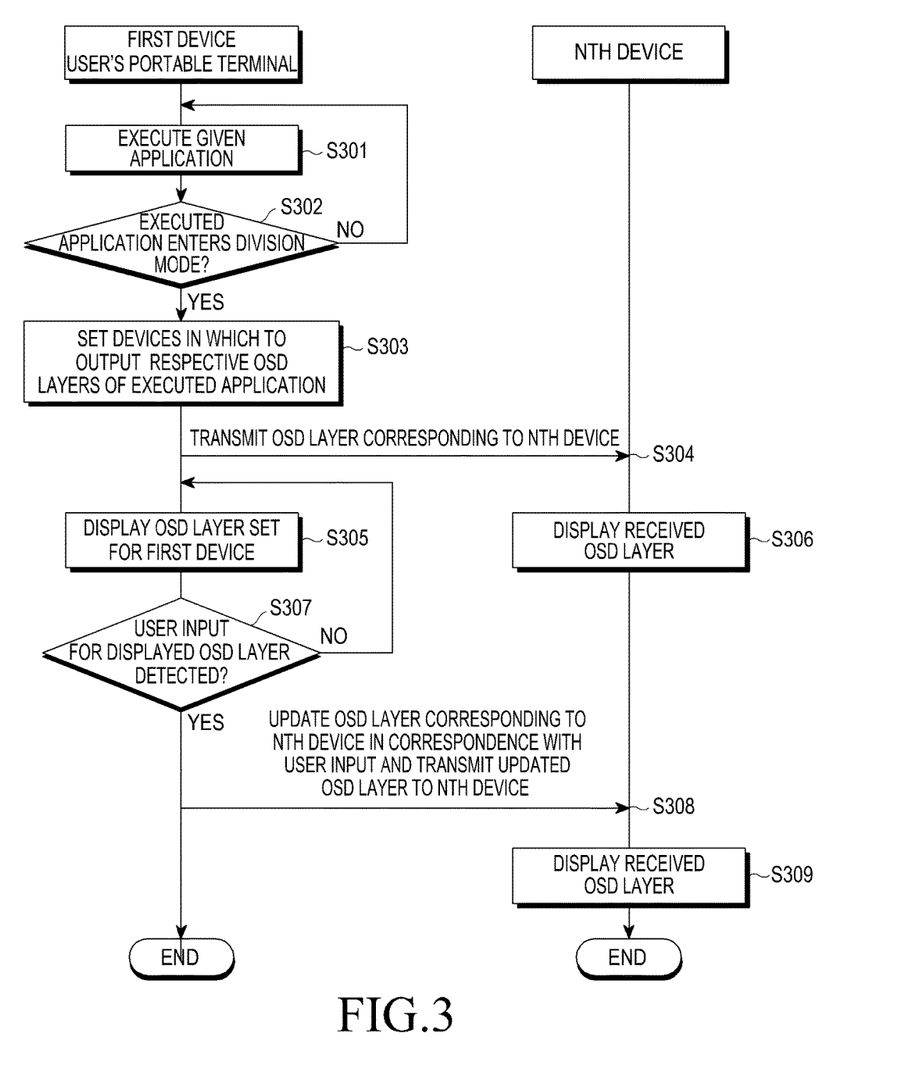
FIG. 3 is a flowchart illustrating a procedure of displaying an application in a portable terminal, according to an embodiment of the present invention.
Figure 6A:
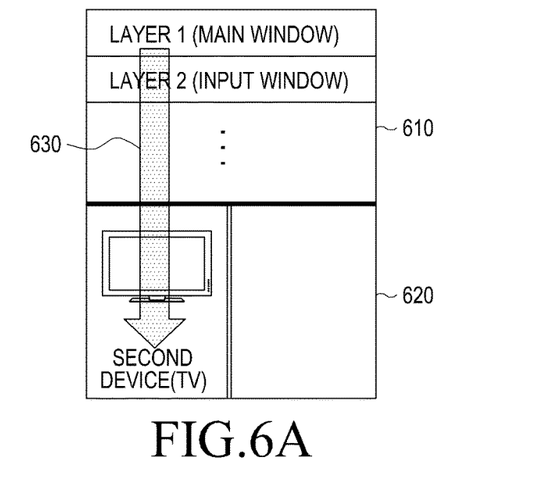
FIGS. 6A, 6B and 6C illustrate procedures of displaying an application in a portable terminal, according to an embodiment of the present invention.
Figures 6B, 6C:
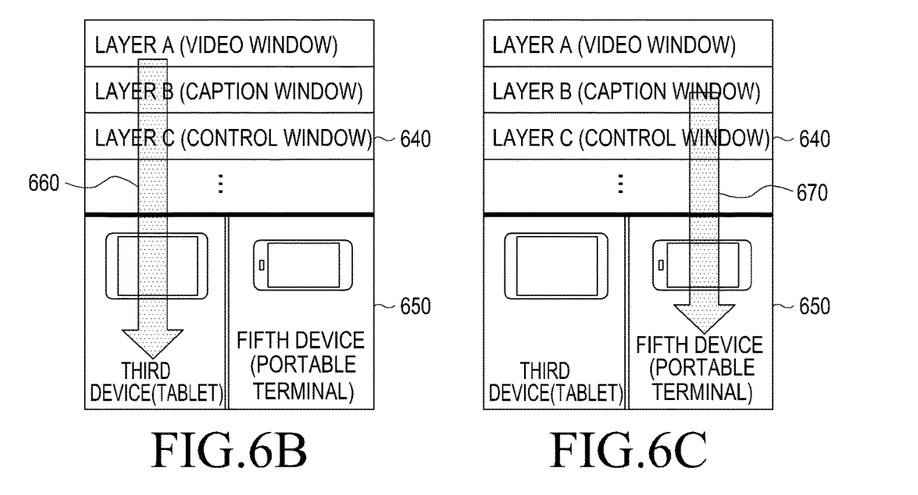
Figure 7:
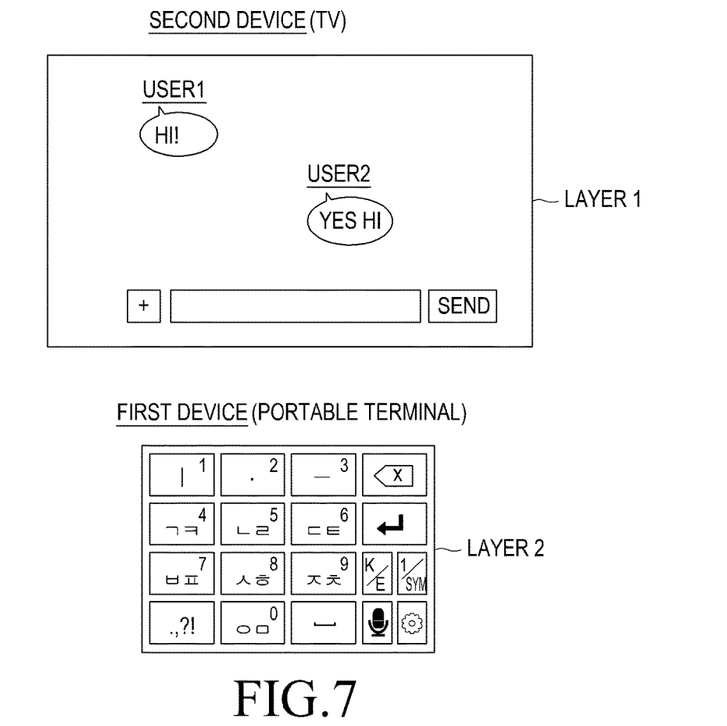
FIG. 7 illustrates a procedure of displaying an application in a portable terminal, according to an embodiment of the present invention.
Figure 8:
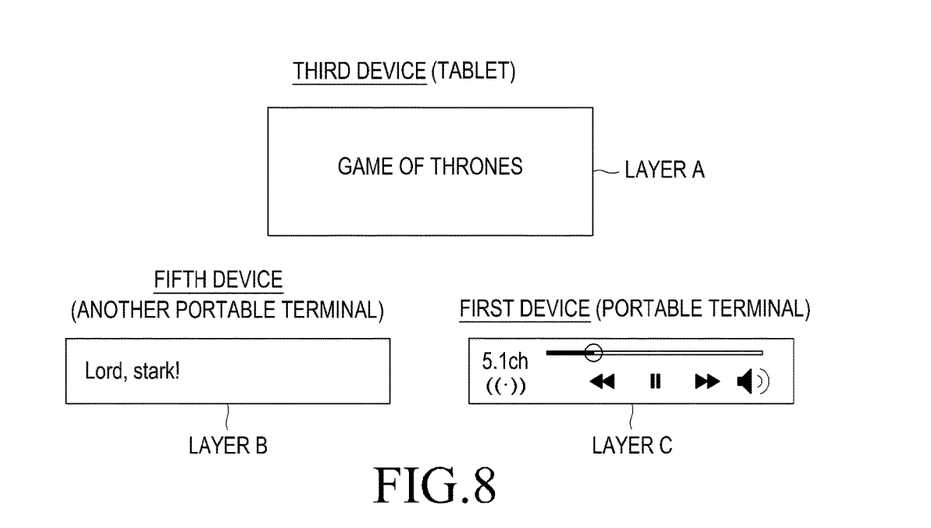
FIG. 8 illustrates a procedure of displaying an application in a portable terminal, according to an embodiment of the present invention.

FIG. 3 is a flow diagram illustrating a procedure of displaying an application in a portable terminal, according to an embodiment of the present invention. FIGS. 6 to 8 illustrate the display of an application in a portable terminal, according to embodiments of the present invention respectively. In FIG. 3, the Nth device is any one of the second to fifth devices 220-250 described with reference to FIG. 2, and means a device other than a user's portable terminal (i.e., the first device 210). Hereinafter, embodiments of the present invention will be described with reference to FIGS. 1 to 8.

In step S301, the controller 10 executes a given application at the request of the user. In step S302, it is determined whether the application enters a division mode. The application enters a division mode upon a request for the executed application to enter the division mode.

It is assumed that an application executed in an embodiment of the present invention is displayed using an OSD method, that is, a method for displaying one image signal in a layered manner on another image signal. Accordingly, in the following description, layers 1 and 2 and layers A to C correspond to OSD layers. The respective layers display data corresponding thereto in a corresponding application while their levels of transparency are adjusted through an alpha blending technique, or the like.

Therefore, the driving screen of an application executed in an embodiment of the present invention is displayed through a plurality of OSD layers. Hereinafter, an application executed in an embodiment of the present invention is described with reference to FIGS. 4A, 4B, 5A and 5B.

Figure 4A:
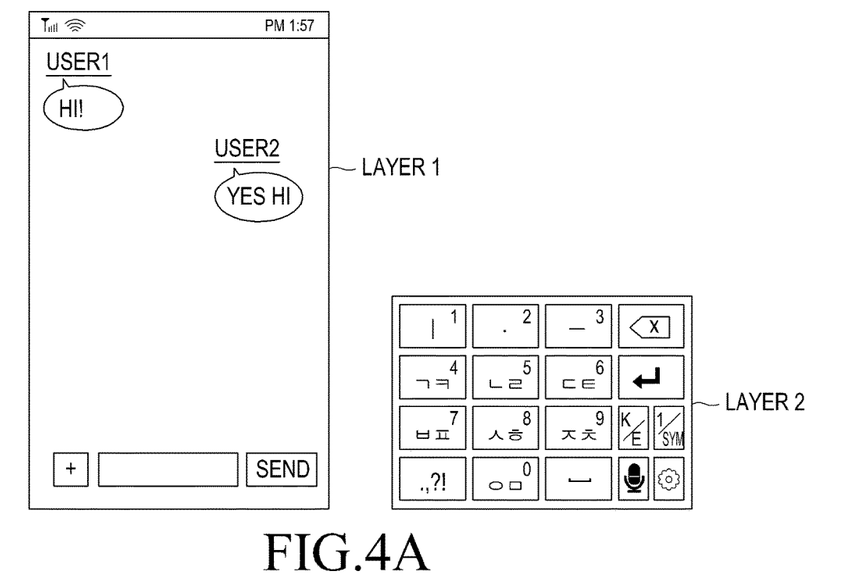
FIGS. 4A and 4B illustrate a message application that is operated through OSD layers, according to an embodiment of the present invention.
Figure 4B:
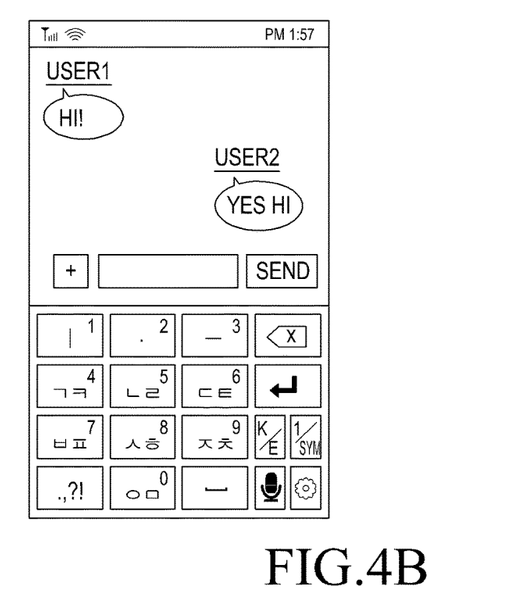

FIGS. 4A and 4B illustrate a message application that is operated through OSD layers. Referring to FIG. 4A, the message application includes layer 1, which corresponds to the main window of the application, and layer 2, which corresponds to the input window through which user inputs can be received.

The user can identify message contents exchanged with a communication counterpart from information displayed through layer 1. The user can input a to-be-transmitted message via the virtual keyboard provided through layer 2. When the message application is executed in one portable terminal (e.g., a portable terminal according to an embodiment of the present invention), layers 1 and 2 shown in FIG. 4A may be displayed in a manner as shown in FIG. 4B, such that the user can use the corresponding message application.

Figure 5A:
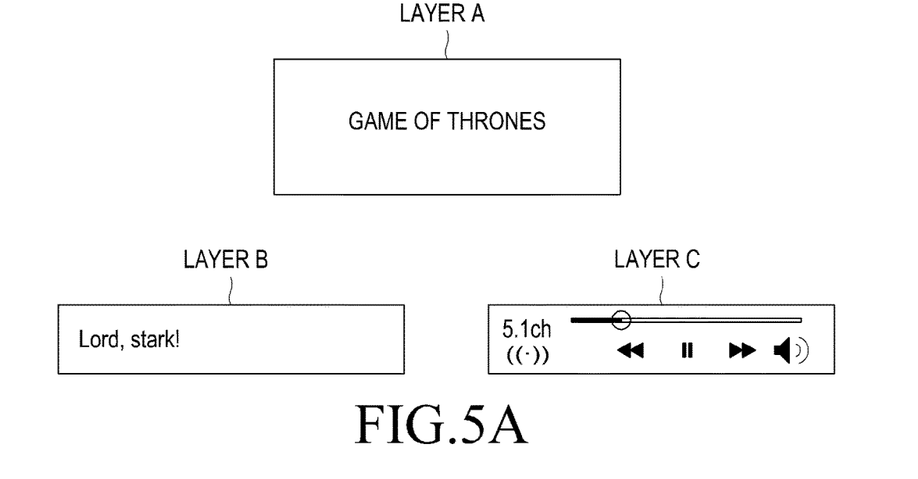
FIGS. 5A, 5B and 5C illustrate a video playback application that is operated through OSD layers, according to an embodiment of the present invention.
Figure 5B:
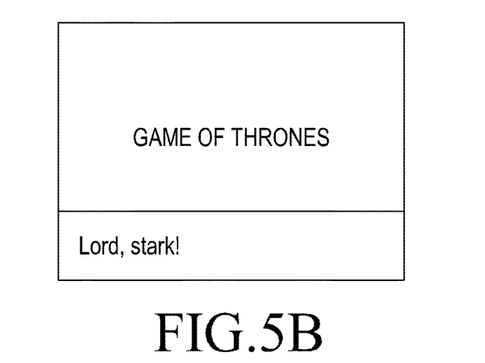
Figure 5C:
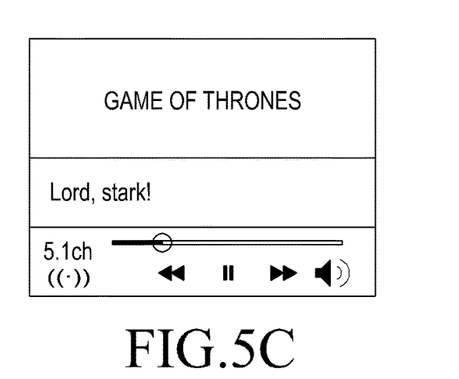

FIGS. 5A, 5B and 5C illustrate a video playback application that is operated through OSD layers. Referring to FIG. 5A, the video playback application provides the user with a video playback function through a plurality of OSD layers, that is, layers A to C.

The video playback application shown in FIG. 5A can display (or play back) video data through layer A, display caption information through layer B, and receive user controls (e.g., user inputs) related to video playback through layer C.

When the video playback application described in FIG. 5A is executed in one portable terminal, if a request for playing back a given video (e.g., Game of Thrones) is made from the user, corresponding video data is displayed through layer A, and caption information is displayed through layer B, in an overlaying manner on layer A, as shown in FIG. 5B.

When the video playback application is executed in one portable terminal, if a request for controlling the playback of the video is made from the user while the video is played back through layers A and B, as shown in FIG. 5B, the layer C is additionally displayed along with the layers A and B, as shown in FIG. 5C. The control window through which user inputs for controlling the playback of the video can be received is displayed in the layer C.

Although the respective layers in FIGS. 4A, 4B, 5A, 5B and 5C are shown in a non-layered manner for the convenience of description, it is apparent to those skilled in the art that each layer may be displayed in a layered manner on another layer through the alpha blending technique or the like.

The applications described with reference to FIGS. 4A, 4B, 5A, 5B and 5C are driven through a plurality of OSD layers, and an embodiment of the present invention provides a function of transmitting an OSD layer selected from among the OSD layers of an executed application to a device other than a user's portable terminal.

The user may select whether to process the OSD layers of the executed application (e.g., application supporting a division mode) only in his/her own portable terminal (e.g., first device 210) or transmit a part or all of the OSD layers to another portable terminal. This is set by the user's selection of whether to enter a division mode. When a given application is executed, the user may select (or set) whether to use the executed application in a division mode through a given menu, icon, or the like.

Referring again to FIG. 3, when it is determined that the executed application enters the division mode in step S302, the controller 10 sets devices to which respective OSD layers of the executed application are output, based on user input.

When it is confirmed that a request for the executed application to enter a division mode is made, the controller 10, according to an embodiment of the present invention, identifies OSD layers of the executed application and displays a list of the identified OSD layers. Additionally, when it is confirmed that a request for the executed application to enter a division mode is made, the controller 10 searches for devices around the portable terminal, which support the division mode according to an embodiment of the present invention, through a function, such as Digital Living Network Alliance (DLNA). The found devices are displayed along with the list of the OSD layers of the executed application.

For example, when the application executed in step S301 is a message application, the controller 10 displays a list of layers 1 and 2 610, which are OSD layers of the message application, as shown in FIG. 6A. A result of a search 620 for the surrounding devices supporting the division mode (the result shows that only the second device 220 has been found) is displayed as shown in FIG. 6A.

When the OSD layer list 610 of the executed application and the result of the search 620 for the surrounding devices are displayed, the user may make a request for displaying layer 1 of the executed application in the second device 220, that is, the TV, through a drag touch input 630 (or separate menu setting) as shown in FIG. 6A.

As another example, when the application executed in step S301 is a video playback application, the controller 10 displays a list of layers A, B, and C 640, which are OSD layers of the video playback application, as shown in FIGS. 6B and 6C. A result of a search 650 for the surrounding devices supporting the division mode is displayed as shown in FIGS. 6B and 6C.

Subsequently, the user may make a request for displaying layer A of the executed application in the third device 230, that is, the tablet, through a drag touch input 660 as shown in FIG. 6B. The user may make a request for displaying layer B of the executed application in the fifth device 250, that is, another portable terminal, through a drag touch input 670 as shown in FIG. 6C.

It is assumed that an OSD layer in the list of the OSD layers, which is not set in such a way as to be output in a device other than the user's portable terminal, is automatically set such that it is output in the user's portable terminal.

For example, layer 2 of the OSD layers shown in FIG. 6A may be automatically set such that it is displayed in the user's portable terminal, and layer C of the OSD layers shown in FIGS. 6B and 6C may be automatically set such that it is displayed in the user's portable terminal. The user may also directly select an OSD layer to be output in his/her portable terminal (e.g., the first device 210) through a predetermined input.

According to a another embodiment of the present invention, when information on a device around the portable terminal (e.g., the first device 210) includes information on the display screen size of the corresponding device, the controller 10 may perform a series of operations capable of providing the user with a function by which the OSD layers of the executed application are easily set or automatically set according to the display screen sizes of the surrounding devices.

For example, the controller 10 may perform automatic setting or recommend that the user to make a selection such that layer 2 for receiving user inputs, layer B for displaying captions during video playback, layer C for controlling video playback, or the like is displayed in the portable terminal (first terminal), according to an embodiment of the present invention, which has a relatively small sized display screen. Also, the controller 10 may perform automatic setting or recommend that the user to make a selection such that the uppermost OSD layer of the executed application, such as layer 1 corresponding to the main window or layer A corresponding to the video window in which a video is displayed during video playback, is displayed in any one of the second to fifth device 250s, which has a larger sized display screen.

Referring again to FIG. 3, in step S304, the controller 10 transmits the OSD layers to the corresponding devices according the setting in step S303. In step S305 the OSD layer, which is set in such a way as to be output in the user's portable terminal, is displayed through the display 50. Upon receiving the OSD layers from the user's portable terminal, the corresponding devices display the corresponding layers, in step S306.

For example, when the executed application is a message application and layer 1 is set such that it is transmitted to the second device 220 (the Nth device), as shown in FIG. 6A, the controller 10 transmits layer 1 to the second device 220, that is, the TV. Subsequently, the controller 10 displays layer 2, which is set in such a way as to be displayed in the user's portable terminal, through the display 50. Also, upon receiving the OSD layers, the corresponding devices display the received OSD layers through their respective displays.

With reference to FIG. 7, upon receiving layer 1 corresponding to the main window of the message application, the second device 220, that is, the TV, displays layer 1 through the TV screen. The controller 10 displays layer 2, corresponding to the input window of the message application, through the display 50.

Thus, the user can use the message application through user inputs, such as an operation of inputting a message through the portable terminal, while conveniently checking a message transmission/reception history.

As another example, the executed application is a video playback application, layer A is set such that it is transmitted to the third device 230, and layer B is set such that it is transmitted to the fifth device 250, as shown in FIGS. 6B and 6C, the controller 10 performs control such that among the layers A to C of the video playback application. Layer A is transmitted to the third device 230, that is, the tablet, and layer B is transmitted to the fifth device 250, that is, another portable terminal. Subsequently, the controller 10 displays layer B, which is set in such a way as to be displayed in the user's portable terminal, through the display 50, and the third and fifth devices 230-250 display the received OSD layers, respectively.

With reference to FIG. 8, the controller 10 displays layer C, corresponding to the control window of the video playback application, through the display 50. The third device 230, that is, the tablet, receives and displays layer A, corresponding to the video window. The fifth device 250, that is, another portable terminal, receives and displays layer B, corresponding to the caption window.

The user can view the video played back through the tablet, which has a larger display screen than that of his/her portable terminal, and if necessary, check captions through the fifth device 250 and control video playback through his/her portable terminal.

In addition, it is assumed that when data to be displayed in layer 1 of the message application and layer A of the video playback application are changed (that is, layer 1 and layer A are updated) after layer 1 and layer A are transmitted to the set devices, the controller 10, according to an embodiment of the present invention, transmits the updated layer 1 and the updated layer A to the corresponding devices, in step S304.

For example, when a new message is received and is to be displayed in layer 1, the controller 10 updates layer 1 to display the contents of the received message, and the updated layer 1 is transmitted to the second device 220. As another example, since the video is displayed in layer A of the video playback application and thus, layer A is continuously updated, the controller 10 continuously updates layer A in correspondence with video playback, and the updated layer A is transmitted to the third device 230. Layer A of the video playback application is transmitted in a real-time streaming manner.

Referring again to FIG. 3, in steps S307, it is determined whether user input is detected via the OSD layer displayed through the display 50. Upon detecting user input, the controller 10 updates an OSD layer of the executed application in correspondence with the detected user input, and the updated OSD layer is transmitted to the corresponding device, in step S308. The corresponding device receives and displays the updated OSD layer, in step S309.

Referring to FIG. 7, for example, the user may compose a message by touching the virtual keyboard, which is presented through layer 2 displayed in his/her portable terminal (the first device 210), in the middle of checking a message transmission/reception history through the second device 220, that is, the TV.

In correspondence with a user input using layer 2, the controller 10 updates layer 1 to display input message contents in real time or display the completed message, and the updated layer 1 is transmitted to the second device 220. Also, the second device 220 receives and displays the updated layer 1. Upon a request for sending the completed message, the controller 10 transmits the completed message through at least one of the wireless transceiver 23 and a short-range communication module.

The user can input a text through his/her portable terminal while checking a text message under composition and a sent text message history.

Steps S307 to S309 of FIG. 3 are described again with reference to FIG. 8. The user may reset a playback section, change the playback position of the video (e.g., pause, rewind, or fast forward), or make a request for playback control of the video (e.g., output volume control of the video) through layer C displayed in his/her portable terminal while viewing the video through the third device 230, that is, the tablet.

In correspondence with the user's request for playback control of the video, the controller 10 updates layer A to display the video, the playback of which is controlled (e.g., changed) according to the user input, and the updated layer A is transmitted to the third device 230. The third device 230 receives and displays the updated layer A.

The user can view the video, in which the user's video control is reflected, through the third device 230, that is, the tablet, while performing the video control through his/her portable terminal.

According to embodiments of the present invention as described above, when a user uses a portable terminal, the usability of the portable terminal can be improved by outputting a text (e.g., text message history) or multimedia contents (e.g., video) through devices around the portable terminal, and outputting an interface related to text input or control of multimedia content playback through the portable terminal of the user.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A display method in a portable electronic apparatus, the display method comprising:
   executing a video playback application for displaying a video on a touch sensitive display of the portable electronic apparatus;
   controlling the video playback application to play the video without displaying a control window of the video playback application for controlling playback of the video;
   in response to receiving a first touch input while playing the video without displaying the control window, controlling the video playback application to display, on the touch sensitive display, the control window of the video playback application along with the video, the control window including a touch selectable icon for displaying the video on an external device;
   in response to a second touch input on the touch selectable icon, displaying, on the touch sensitive display, an indication of at least one external device that is able to display the video; and
   in response to a third touch input selecting the displayed indication of the at least one external device:
      transmitting the video to the selected external device for displaying the video by the selected external device without transmitting the control window to the selected external device, and
      controlling the video playback application to hide the video on the touch sensitive display of the portable electronic apparatus and controlling the video playback application to display, on the touch sensitive display of the portable electronic apparatus without displaying the video, the control window for controlling the video being displayed on the selected external device.

2. The display method as claimed in claim 1, wherein the touch sensitive display includes a first area that is active to receive the first touch input and a second area that is active to receive at least one of the second touch input and the third touch input while the first area is active.

3. The display method as claimed in claim 1, further comprising controlling another external device to display captions associated with the video in response to a fourth touch input on the touch sensitive display.

4. The display method as claimed in claim 1, wherein, in response to the second touch input on the touch selectable icon, the indication of the at least one external device, an indication of the video, an indication of the control window, and an indication of a caption associated with the video are displayed on the touch sensitive display.

5. The display method as claimed in claim 1, wherein at least one graphic element of the video playback application is automatically set for the portable electronic apparatus.

6. The display method as claimed in claim 1, further comprising:
   in response to a fourth touch input selecting a control element of the control window displayed on the touch sensitive display of the portable electronic apparatus for controlling the video being displayed on the selected external device, updating the video to be displayed on the selected device based on the fourth touch input; and
   transmitting the updated video to the selected external device.

7. The display method as claimed in claim 1, further comprising, when the video is updated according to operations of the video playback application, transmitting the updated video to the selected external device.

8. The display method as claimed in claim 1, further comprising controlling the selected external device to display, on the video, captions associated with the video.

9. A portable electronic apparatus comprising:
   a transceiver;
   a touch sensitive display; and
   a controller configured to:
   execute a video playback application for displaying a video on the touch sensitive display;
   control the video playback application to play the video without displaying a control window of the video playback application for controlling playback of the video;
   in response to receiving a first touch input while playing the video without displaying the control window, control the video playback application to display, on the touch sensitive display, the control window of the video playback application along with the video, the control window including a touch selectable icon for displaying the video on an external device;
   in response to a second touch input on the touch selectable icon, display, on the touch sensitive display, an indication of at least one external device that is able to display the video; and
   in response to a third touch input selecting the displayed indication of the at least one external device:
      control the transceiver to transmit the video to the selected external device for displaying the video by the selected external device without transmitting the control window to the selected external device, and
      control the video playback application to hide the video on the touch sensitive display of the portable electronic apparatus and control the video playback application to display, on the touch sensitive display of the portable electronic apparatus without displaying the video, the control window for controlling the video being displayed on the selected external device.

10. The portable electronic apparatus as claimed in claim 9, wherein the touch sensitive display includes a first area that is active to receive the first touch input and a second area that is active to receive at least one of the second touch input and the third touch input while the first area is active.

11. The portable electronic apparatus as claimed in claim 9, wherein the at least one processor is further configured to automatically set at least one graphic element of the video playback application for the portable electronic apparatus.

12. The portable electronic apparatus as claimed in claim 9, wherein, when the video is updated according to operations of the video playback application, the at least one processor is further configured to control the updated video to be transmitted to the selected external device.

13. The portable electronic apparatus as claimed in claim 9, wherein the at least one processor is further configured to control the selected external device to display, on the video, captions associated with the video.

14. A non-transitory computer-readable medium storing instructions that are executable by at least one processor of a portable electronic device to cause the at least one processor to:

execute a video playback application for displaying a video on a touch sensitive display of the portable electronic device;

control the video playback application to play the video without displaying a control window of the video playback application for controlling playback of the video;

in response to receiving a first touch input while playing the video without displaying the control window, control the video playback application to display, on the touch sensitive display, the control window of the video playback application along with the video, the control window including a touch selectable icon for displaying the video on an external device;

in response to a second touch input on the touch selectable icon, display, on the touch sensitive display, an indication of at least one external device that is able to display the video; and in response to a third touch input selecting the displayed indication of the at least one external device:

transmit the video to the selected external device for displaying the video by the selected external device without transmitting the control window to the selected external device, and control the video playback application to hide the video on the touch sensitive display of the portable electronic apparatus and control the video playback application to display, on the touch sensitive display of the portable electronic apparatus without displaying the video, the control window for controlling the video being displayed on the selected external device.

15. The non-transitory computer-readable medium as claimed in claim 14, wherein the at least one processor is further configured to automatically set at least one graphic element of the video playback application for the portable electronic apparatus.

16. The non-transitory computer-readable medium as claimed in claim 14, wherein, when the video is updated according to operations of the video playback application, and the at least one processor is further configured to control the updated video to be transmitted to the selected external device.

17. The non-transitory computer-readable medium as claimed in claim 14, wherein the at least one processor is further configured to control the selected external device to display, on the video, captions associated with the video.

18. The non-transitory computer-readable medium as claimed in claim 14, wherein the touch sensitive display includes a first area that is active to receive the first touch input and a second area that is active to receive at least one of the second touch input and the third touch input while the first area is active.

* * * * *